(12) United States Patent
Chen et al.

(10) Patent No.: US 8,407,694 B2
(45) Date of Patent: Mar. 26, 2013

(54) SYSTEM AND METHOD FOR FACILITATING INSTALLING SOFTWARE

(75) Inventors: Ying Chen, Beijing (CN); Ying Li, Beijing (CN); Jie Qiu, Beijing (CN); Ke Wei Sun, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 1364 days.

(21) Appl. No.: 11/880,830

(22) Filed: Jul. 24, 2007

(65) Prior Publication Data

US 2008/0028392 A1   Jan. 31, 2008

(30) Foreign Application Priority Data

Jul. 25, 2006   (CN) .......................... 2006 1 0107764

(51) Int. Cl.
*G06F 9/445* (2006.01)
(52) U.S. Cl. .......................... 717/175; 717/122; 717/169
(58) Field of Classification Search .......... 717/174–178, 717/122, 169, 170; 707/609–686
See application file for complete search history.

(56) References Cited

U.S. PATENT DOCUMENTS

| | | | | |
|---|---|---|---|---|
| 5,497,455 A | * | 3/1996 | Suga et al. | 715/835 |
| 5,675,831 A | * | 10/1997 | Caputo | 710/10 |
| 6,698,018 B1 | * | 2/2004 | Zimniewicz et al. | 717/175 |
| 2004/0255291 A1 | * | 12/2004 | Sierer et al. | 717/174 |

OTHER PUBLICATIONS

Venkatakrishnan et al.; An Approach for Secure Software Installation; the Proceedings of LISA '02: Sixteenth Systems Administration Conference; Berkeley, CA: USENIX Association, 2002; pp. 1-15.*
Hasselmeyer; Managing Dynamic Service Dependencies; aquired from http://citeseerx.ist.psu.edu/viewdoc/download?doi=10.1.1.25.1198&rep=rep1&type=pdf; pp. 1-10.*
Oetiker; SEPP Software Installation and Sharing System; USENIX; published in the Proceedings of the Twelfth Systems Administration Conference (LISA '98) Boston, Massachusetts, Dec. 6-11, 1998; pp. 253-260.*
Hasselmeyer; Managing Dynamic Service Dependencies; aquired from http://citeseerx.ist.psu.edu/viewdoc/download?doi=10.1.1.25.1198&rep=rep1&type=pdf; 2001, pp. 1-10.*

* cited by examiner

*Primary Examiner* — Wei Zhen
*Assistant Examiner* — Satish Rampuria
(74) *Attorney, Agent, or Firm* — William Stock; Anne Vachon Dougherty (57) ABSTRACT

A system and method for facilitating installing software includes steps and means for identifying whether the phase of a software installing process changes and, responsive to the identifying a change in the phase of the software installing process, executing an additional task of the current phase of the software installing process.

18 Claims, 7 Drawing Sheets

Fig.1

| | |
|---|---|
| 210 — Problem ID | CMN7718S |
| 220 — Symptom | This is a warning message indicating that the directory the user entered is read-only. The installer will not be able to write to the specified directory. |
| 230 — Resolution | 1) The directory specified is a CD-ROM drive or path.<br>2) The directory specified has been set to read-only.<br>3) The user does not have the authority to write to this directory.<br>Action:<br>Enter a directory which has write-permissions for your user ID. |
| 240 — Category | Websphere Application Server 5.0<br>Installation<br>Linux9.0 |
| 250 — Checking script (extended) | CMN7718S_pathaccessvalidate.csh<br>Installer: RPM<br>Shell: csh<br>Parameters: String directory |
| 260 — Resolving script (extended) | CMN7718S_changeDirectory.pl<br>Shell: perl |

```xml
<?xml version="1.0" encoding="UTF-8"?>
<COMFORT>
    <Problem id=" CMN7718S">
        <Description content= "This is a warning message..." />
        <DetectionMethod ref= "CMN7718S_detectionscripts" />
        <ResolutionMethod ref= "CMN7718S_resolutionscripts" />
    </Problem>
    <TaskItem id= "CMN7718S_detectionscripts"  type= "detect" />
        <shell  name= "csh" />
        <scripts name=  "CMN7718S_pathacessvalidate.csh"/>
        <parameter name= "su"  , value= "root" />
        <parameter name= "basedir"  value= "/" />
         <phase id="pre-install">
         ...
    </TaskItem>
    <TaskItem id="CMN7718S_resolutionscripts" type="resolve">
         ...
         <phase id="pre-install">
         ...
    </TaskItem>
</COMFORT>
```

SYSTEM AND METHOD FOR FACILITATING INSTALLING SOFTWARE

FIELD OF THE INVENTION

The present invention relates to the field of information technology and, more particularly, to a system and method for facilitating installing software.

BACKGROUND OF THE INVENTION

Nowadays, software is usually deployed in a complex environment. For example, a new software needs to be deployed in an environment where it must co-exist with other software or deployed across heterogeneous platforms (such as different operating systems). During the deployment, the installation of this new software is prone to failure due to, for example, complicated dependent relationships with other software and exclusive relationships with other software.

Refer to the following two situations:

1. After Globus® toolkit 3* (* indicates this and subsequent terms may be trademarks of the respective owners) released on JVM* (Java™ Virtual Machine*) 1.4.0, the Sun® Corporation released JVM 1.4.2. Therefore, the Globus® toolkit 3 needs a patch in order to run on the new JVM 1.4.2. However, during the installation of Globus® toolkit 3, the installer thereof cannot automatically resolve the patch problem. Thus, Globus® toolkit 3 is prone to failure when running on JVM 1.4.2. Only after a user resorts to a technical support website, will he(she) know that the Globus® toolkit 3 needs a patch in order to run on JVM 1.4.2.

2. To install DB2® on Linux®, a parameter for the kernel should be set. If the deployer ignores it, failure will occur during the installation of DB2® on Linux®.

A software installer is an executable software package to install a piece of software on a specific operating system. Software installers are always written by scripts and compiled to executable binary files. Examples of tools for making software installers include, but are not limited to:

For Windows® operating systems: Install shield*, Install suite*, and Windows® installer*;

For Linux® operating systems: RPM* (Redhat® Package Manager*); and

For TPM* (Tivoli® Provisioning Manager*, a software product of IBM®): Workflow*.

A software installer generally includes three parts: a dependency and conflict checking part for, for example, checking prerequisites and platform consistency; a software package installing part for, for example, unpacking software, copying the software to a right place, and registering COM (component object model) component; and a software configuring part for, for example, writing some configuration parameters to a configuration file.

In other words, the process of installing software generally includes three phases, i.e. a dependency and conflict checking phase, a software package installing phase, and a software configuring phase.

For the existing software installers made by using tools, like Install shield, RPM or TPM workflow, scripts thereof are packaged and compiled once into executable files. Therefore, the existing software installers are static.

Generally, after a new piece of software has been shipped, it will be installed in an environment in which various other software has been installed and in which various shipped software is to be installed. Therefore, before the shipment of a new piece of software, all conflicts between the software and other shipped existing and expected software in the same environment can be checked. In other words, during the installation of a new piece of software, the software installer thereof can check conflicts between the new piece of software and other shipped existing and expected software in the environment.

However, after the shipment of the new piece of software, it is impossible for the software installer to check conflicts between the new piece of software and other software which is to be shipped after the shipment of the new piece of software.

Additionally, when coding the software installer of the software, the programmer can hardly predict what problems will occur in future installation.

Therefore, failure is likely to occur during either the installing of the software using a static software installer or the running of the software. To resolve the failure, deployers or users have to search manuals or websites providing technical support to find some ways out.

Currently, there are many websites or symptom databases for providing technical support. These websites or databases always have the up-to-date solutions to these problems. However, users need much specific knowledge to understand solutions from the websites or databases.

Currently, in the case that software is installed by using the existing static software installer, when installation fails, the failure can hardly be resolved automatically.

Therefore, the existing software installer cannot meet the following deployment requirements:

1. Requirement from the Software Provider: after software is shipped, the software installer needs to be updated. For example, the software installer is required to install a latest patch of the software during the existing installation flow so as to provide more functions;

2. Requirement from the Solution Developer: the software installer needs to automatically change some configurations in relevant configuration files for a specific solution; and 3. Requirement from the Operator of technical support or software symptom management: the software installer needs to automatically resolve some installation problems based on a relevant symptom database, for example, resolve conflicts with other software which is to be shipped after the shipment of the software, i.e. automatically check and resolve conflicts.

SUMMARY OF THE INVENTION

It is an object of the present invention to provide a system and method for facilitating installing software in order to overcome the above technical problems in the prior art and to meet the requirements from the Software Provider, the Solution Developer, and the Operator of technical support or software symptom management.

According to one aspect of the present invention, what is proposed is a system for facilitating installing software comprising: an identifier for identifying whether the phase of a software installing process changes; and a task scheduler for, responsive to that said identifier identifying that the phase of the software installing process has changed, executing an additional task of the current phase of the software installing process.

In one embodiment, the executed additional task can include checking for dependency and conflicts between the software and other software. In another embodiment, the additional task can include patching the software, installing a piece of software, and/or uninstalling a piece of software. Further, the additional task can include adding configurations in a configuration file, changing configurations in the configuration file, and/or deleting configurations in the configuration file.

According to one embodiment, the system can further comprise a symptom reporter for reporting failure occurring during the execution of said additional task.

According to one embodiment, the system can further comprise an updater for obtaining update data at least comprising said additional task and script for executing the additional task.

According to one embodiment, the update data comes from a packager and distributor.

According to another embodiment, the update data comprises a datasheet and/or artifacts from a software repository, a datasheet and/or artifacts from a solution repository, and/or a datasheet and/or artifacts from a symptom database, wherein the symptom database comprises problem checking scripts and corresponding problem resolving scripts.

According to another aspect of the present invention, further proposed is a method for facilitating installing software, comprising the steps of: identifying whether the phase of a software installing process changes; and, responsive to identification of a phase change of the software installing process, executing an additional task of the current phase of the software installing process.

The invention also provides a computer program product comprising computer executable code embodied in a computer readable medium for performing the inventive method.

According to the present invention, software can be installed in accordance with different deployment requirements.

BRIEF DESCRIPTION ON THE DRAWINGS

Other objects and effects of the present invention will become more apparent and easy to understand from the following description, taken in conjunction with the accompanying drawings, wherein.

In all the above drawings, like reference numerals designate the same, similar, or corresponding features or functions.

DESCRIPTION OF THE PREFERRED EMBODIMENTS

The basic idea of the present invention is to use a task scheduler to execute an additional task in addition to a build-in task executed by the existing software installer. The build-in task is, for example, a conventional task executed by the existing software installer, and the additional task is, for example, a task which can meet the above-mentioned deployment requirements.

Preferred embodiments of the present invention will be described below.

Figure 1:
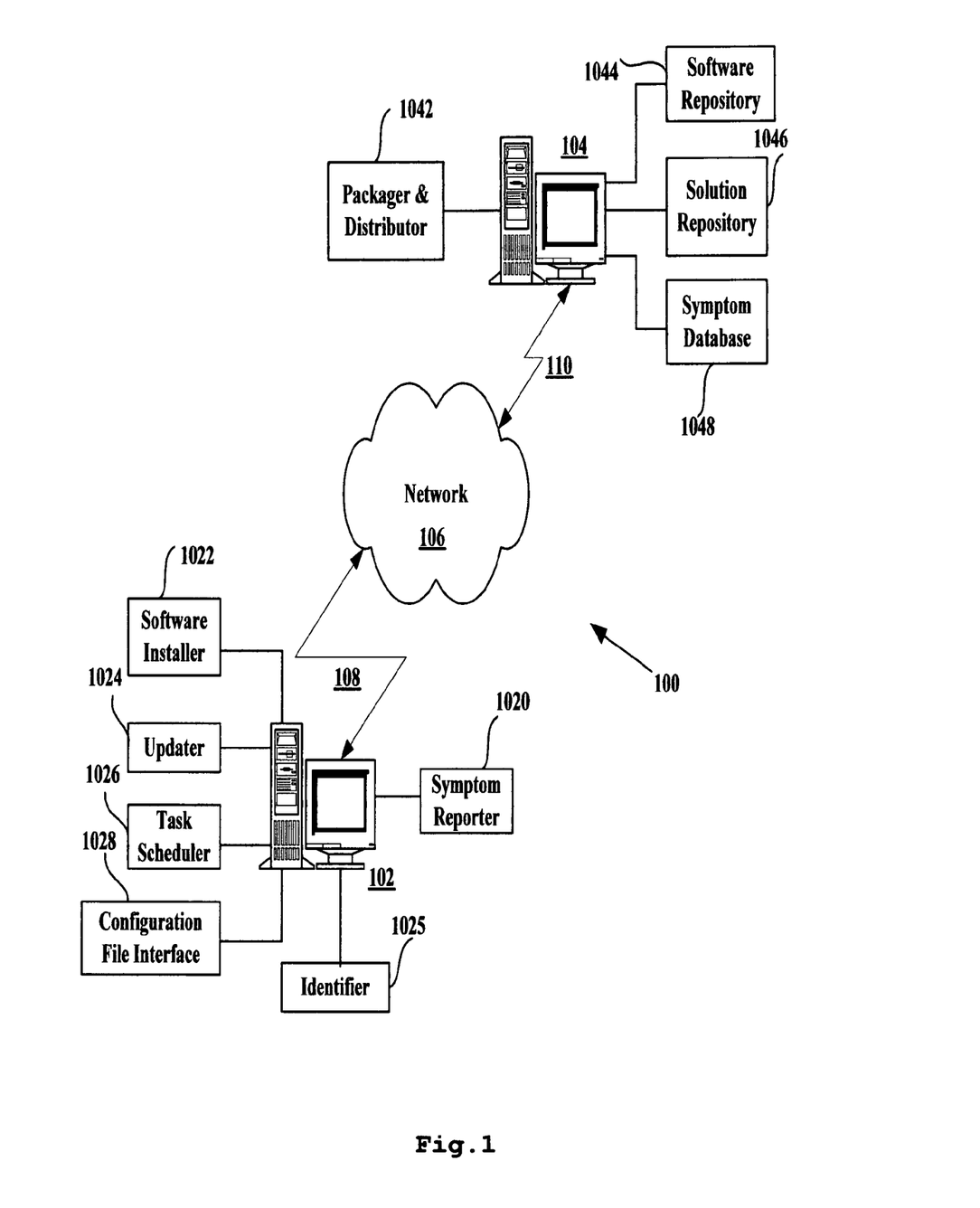
FIG. 1 schematically depicts a network system in which the present invention can be implemented.

FIG. 1 schematically depicts a network system 100 in which the present invention can be implemented and in which a system and method for facilitating installing software according to the present invention can be applied. Network system 100 comprises: a client 102, a server 104, and a network 106. Client 102 and server 104 can be laptop computers, small computers, middle computers, etc. Client 102 and server 104 are connected to network 106 via a link 108 and a link 110, respectively. In other words, client 102 can communicate with server 104 via link 108, network 106, and link 110. Links 108 and 110 can be wired or wireless links, such as coaxial cables, optical fibers, satellite links, etc. Likewise, network 106 can be a wireless network, a wired network, or a combination thereof. Further, network 106 can be a local area network, a metropolitan area network, a wide area network, or a combination thereof. In the illustrated example, network 106 is the Internet.

Of course, those skilled in the art should understand that other clients and/or servers can be connected on network 106. Therefore, in order to be distinguished from each other, the clients and servers can have IDs uniquely identifying themselves, such as IP addresses, uniform resource locators (URLs), etc.

Various software is installed in client 102, including operating system software, such as Windows® XP* and Redhat® Linux® 9.1*, and application software installed in accordance with needs. In general, each software has its own installer for installing the software to client 102.

In particular, client 102 preferably includes a symptom reporter 1020, a software installer 1022, an updater 1024, an identifier 1025, a task scheduler 1026, a configuration file interface 1028, etc. Functions of these entities and relationships therebetween will be described in detail below.

In server 104, various software can also be installed, including operating system software, such as Windows® XP* and Redhat® Linux® 9.1*, and application software installed in accordance with needs.

In particular, server 104 preferably includes a packager and distributor 1042, a software repository 1044, a solution repository 1046, and a symptom database 1048. The packager and distributor 1042 packages and distributes a datasheet and/or artifacts provided by a software repository (provided by the Software Provider) 1044, a datasheet and/or artifacts provided by a solution repository (provided by the Solution Developer) 1046, and a datasheet and/or artifacts provided by a symptom database (provided by the Operator of technical support or software symptom management) 1048, so that these datasheets and/or artifacts can be obtained by client 102.

A datasheet can include various additional tasks, such as a task for checking dependency and conflicts between software, a task for resolving upon checking of a dependency and conflict problem, a task for changing configurations in a configuration file, etc. Further, a datasheet can include configuration parameters for changing configurations in a configuration file. Datasheets can be written with XML (extensible markup language).

Artifacts can include various scripts for executing various additional tasks, software, software patches and the like.

Examples of scripts include, but are not limited to, scripts for checking dependency and conflict between software, scripts for resolving said dependency and conflict problem upon checking thereof, and scripts for changing configurations in a configuration file.

The datasheet and/or artifacts provided by the software repository 1044 is/are used, for example, to distribute software or patch software.

The datasheet and/or artifacts provided by the solution repository 1046 is/are used, for example, to provide desired software and relevant specific configurations for a specific solution (such as a security solution).

The datasheet and/or artifacts provided by the symptom database 1048 is/are used, for example, to automatically resolve some known software installation problems, for example, to check and resolve dependency and conflicts.

In one embodiment of the present invention, the symptom database 1048 can be extended to include not only descriptions of some problems but also scripts for checking these problems and scripts for resolving these problems, so that some known software installation problems can be resolved automatically.

Figure 2:
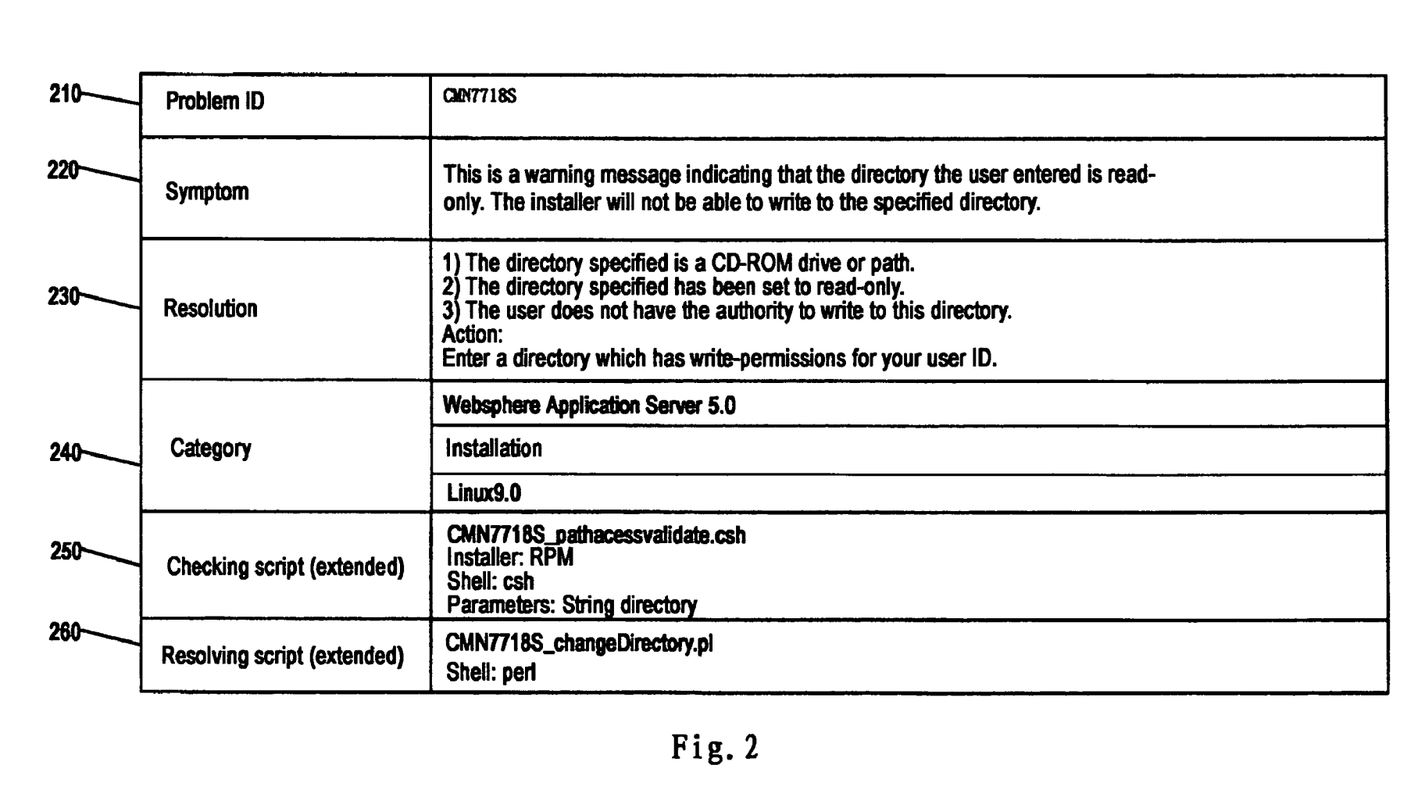
FIG. 2 depicts an example of a symptom database according to an embodiment of the present invention.

FIG. 2 depicts an example of a symptom database according to an embodiment of the present invention. As depicted in FIG. 2, in symptom database 1048 are included problem ID 210, symptom 220, solution 230, category 240, checking script 250, and resolving script 260. Problem ID 210 describes the number of a problem. Symptom 220 describes the cardinal symptom of the problem. Solution 230 describes a solution to resolve the above problem. Category 240 describes the situation (s) in which the problem occurs (e.g., the problem occurs to which software, in which operating system, and in which phase). Checking script 250 describes script for checking the problem, including script name, executing environment, parameters, etc. Resolving script 260 describes script for resolving the problem, including script name, executing environment, parameters, etc. The extended portion includes checking script 250 and resolving script 260.

Figure 3:
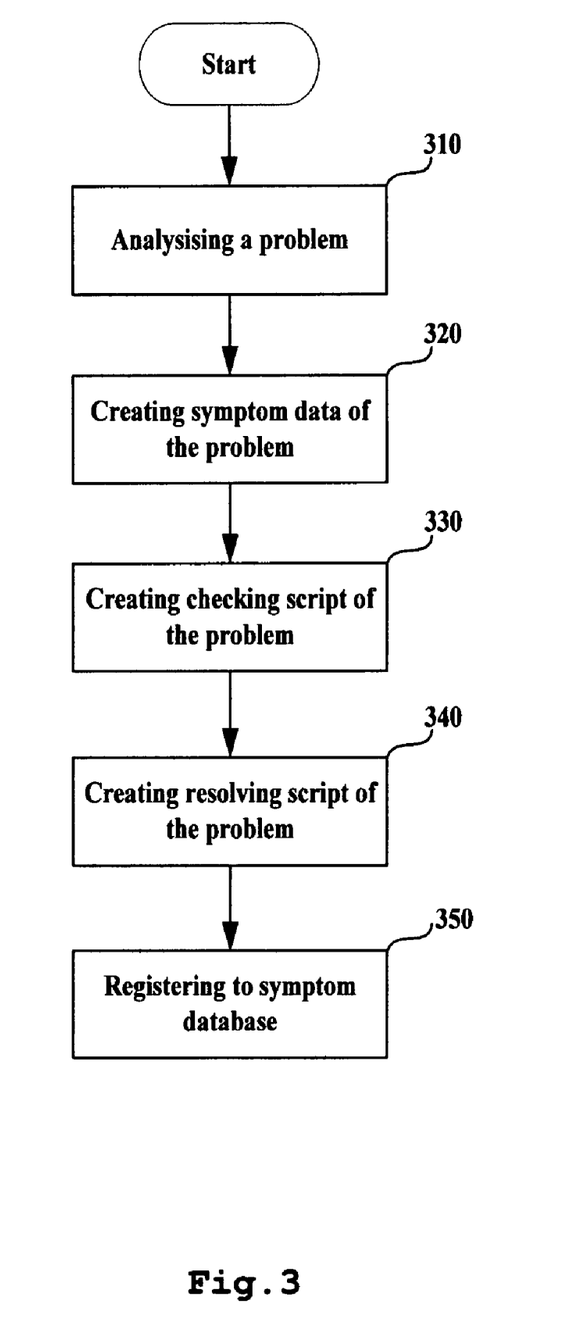
FIG. 3 depicts a method for creating/updating a symptom database according to an embodiment of the present invention.

FIG. 3 depicts a method for creating/updating the symptom database according to an embodiment of the present invention. The method comprises the steps of: analyzing a problem (step 310); creating symptom data of the problem (step 320), for example, creating problem ID 210, symptom 220, solution 230, and category 240; creating a checking script for the problem (step 330), for example, creating checking script 250; creating a resolving script for the problem (step 340), for example, creating resolving script 260; and registering the above contents to the symptom database (step 350).

Figure 4:
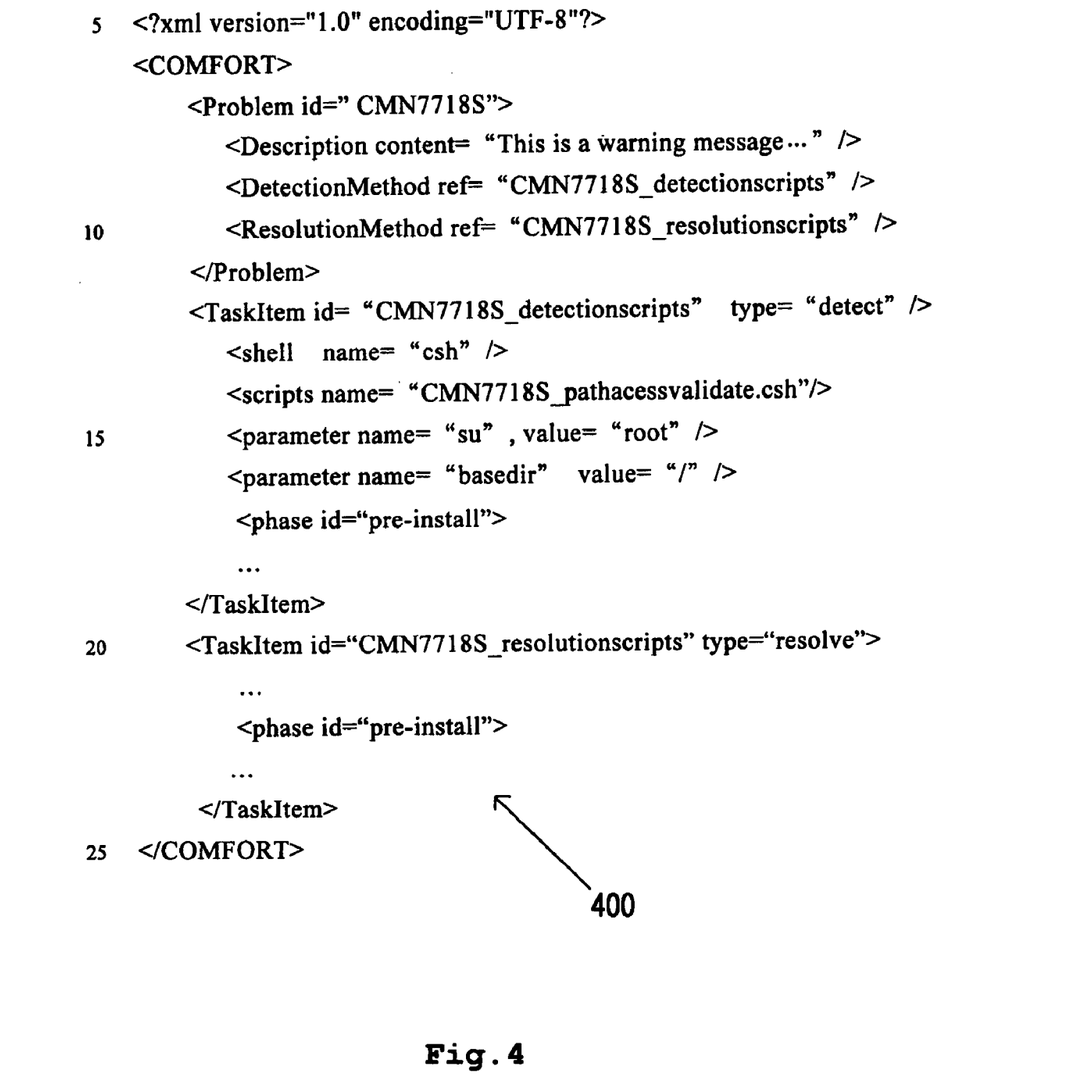
FIG. 4 depicts an example of a datasheet.

FIG. 4 depicts an example of a datasheet. The datasheet 400 includes problem (lines 7-11) and task for checking and resolving the corresponding problem (lines 12-24). The problem portion includes description item (line 7), message item (line 8 with the message to be indicated to a user), and task item (lines 9-10). The task portion includes: type of the task (lines 12 and 20), for example, to check or resolve; script for executing the task (line 14); when to execute the task (lines 17 and 22); and parameters needed for executing the task (lines 15-16). The datasheet as depicted in FIG. 4 is provided, for example, by symptom database 1048.

Although software repository 1044, solution repository 1046, and symptom database 1048 depicted in FIG. 1 are provided on server 104, it should be understood to those skilled in the art that they can also be located in other devices on network 106, respectively, and can be accessed by the packager and distributor 1042 located on server 104 via link 110 and network 106.

Figure 5:
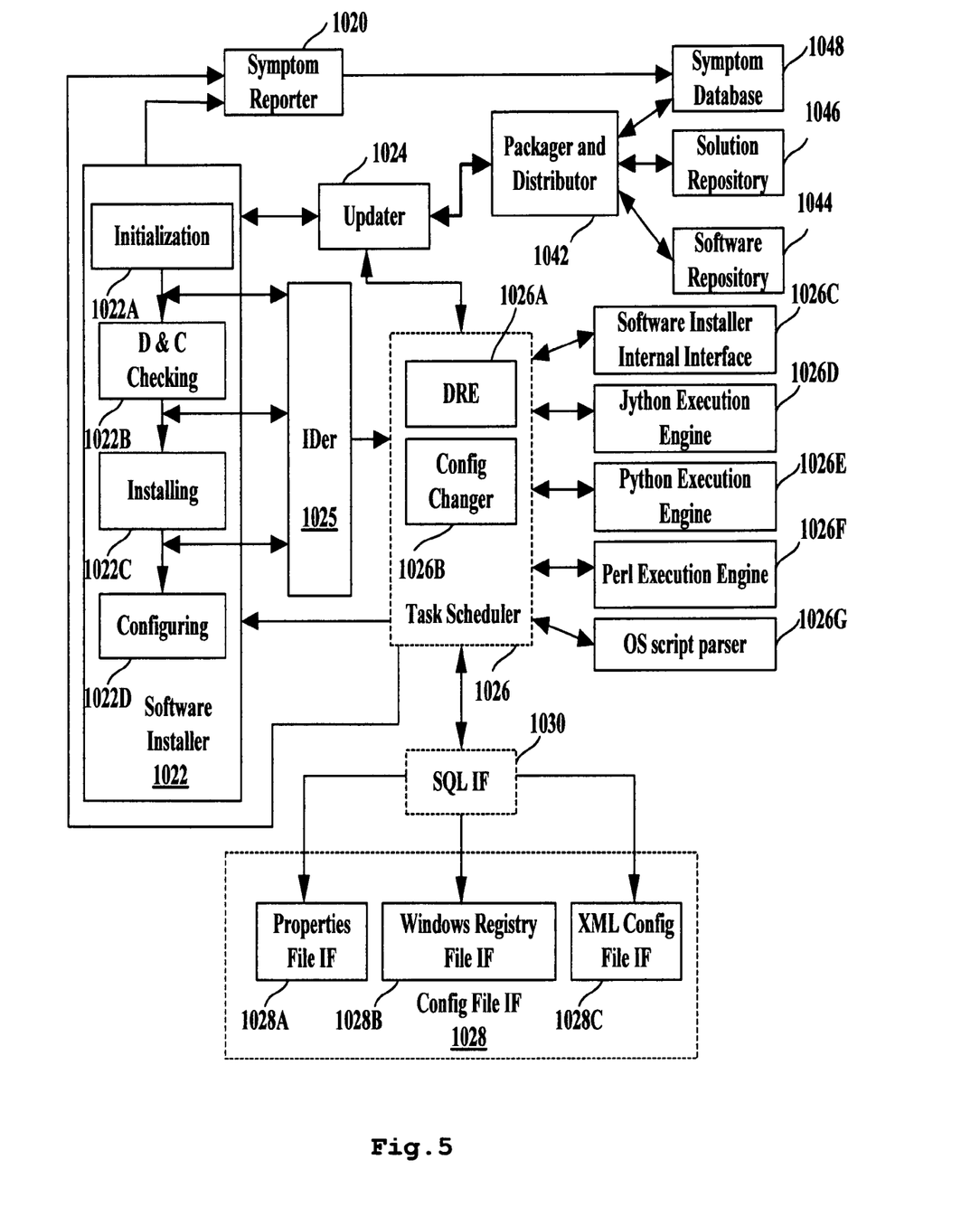
FIG. 5 depicts in detail respective entities included in FIG. 1 and relationships therebetween.

FIG. 5 depicts in detail respective entities included in FIG. 1 and relationships therebetween. According to an embodiment, software installer 1022 comprises: an initialization portion 1022A for initializing a software installing process; a dependency and conflict checking portion 1022B for, for example, checking prerequisites, platform consistence, etc.; a software package installing portion 1022C for, for example, unpacking the installed software, copying the software to a right place, and registering COM (component object model) component, etc.; and a software configuring portion 1022D for, for example, writing some configuration parameters to a configuration file.

In other words, in this embodiment, the software installing process using software installer 1022 includes four phases (i.e., an initialization phase, a dependency and conflict checking phase, a software installing phase, and a software configuring phase).

When the software installer 1022 is started, the initialization portion 1022A first collects information about the software installer 1022, the version of software to be installed, the date, the environment information on client 102, for example, whether the operating system installed on client 102 is Windows XP, Redhat Linux 9.1 or other operating system, relevant information of software installed on client 102, and the like. Then, the initialization portion 1022A sends the above information to the packager and distributor 1042 in server 104 via updater 1024. For example, the above sending can be implemented in the case that the URL address of server 104 is stored in updater 1024.

Upon receipt of the above information, packager and distributor 1042 packages and distributes such datasheets and/or artifacts obtained by querying the above software repository 1044, solution repository 1046, and symptom database 1048 using the above information, and corresponding to the above information. In this manner, updater 1024 can obtain these datasheets and/or artifacts and store them therein. Additionally, updater 1024 can further unpack these packaged datasheets and/or artifacts for future use.

The datasheet and/or artifacts provided by software repository 1044 can include a requirement to patch the software. The datasheet and/or artifacts provided by solution repository 1046 can include a requirement to change configurations of a configuration file. The datasheet and/or artifacts provided by symptom database 1048 can include a requirement to automatically resolve some software installation problems.

When initialization portion 1022A accomplishes its task, the dependency and conflict checking portion 1022B will execute its build-in task; in other words, when the phase of the software installing process changes, software installer 1022 temporarily suspends executing its build-in task, and task scheduler 1026 executes the additional task so that the software installing process can meet different deployment requirements.

In an embodiment of the present invention, when the phase of the software installing process changes, software installer 1022 temporarily suspends executing the build-in task of the next phase and sends a message to task scheduler 1026. The message includes some parameters that, for example, include at least the current phase of the software installing process. This procedure is identified by identifier 1025 that triggers task scheduler 1026 to execute the corresponding additional task. The identifier 1025, for example, can be an interception program resident on task scheduler 1026.

In another embodiment of the present invention, identifier 1025 itself monitors a change in the phase of the software installing process, obtains some parameters that, for example, include at least the current phase which the software installing process is in, triggers task scheduler 1026 to execute the corresponding additional task, and prevents software installer 1022 from executing the build-in task of the next phase.

Logically, task scheduler 1026 is mainly divided into a detection and resolution executor (DRE) 1026A and a configurations changer 1026B. Of course, those skilled in the art can understand that the above division is implemented in accordance with the main functions of task scheduler 1026. This division is merely illustrative and not restrictive. For example, DRE 1026A can further execute any additional tasks, such as task for patching software and the like, as long as these additional tasks are written by supported scripts.

After task scheduler 1026 is triggered, it retrieves an additional task needed by the current phase from the updater 1024 and executes the additional task. Specifically, with the exception of a configuring additional task, DRE 1026A executes the additional task in accordance with the script type of the additional task in an environment, such as software installer internal interfaces (1026C), Jython execution engine (1026D), Python Execution engine (1026E), Perl execution engine (1026F), and operating system script parser (shell) (1026G). In this phase, the above additional tasks can include additional dependency and conflict checking, (i.e. dependency and conflict checking different from that executed by dependency and conflict checking portion 1022B).

It should be understood that when task scheduler 1026 finds that the above datasheets and/or artifacts downloaded by updater 1024 do not include the desired datasheets and/or artifacts, it can request that the packager and distributor 1042 provide the desired datasheets and/or artifacts via updater 1024.

Further, it should be understood that relationships between the respective entities can be such that task scheduler 1026 obtains environment information of client 102 and other information, including information of the software installer per se and version information of software to be installed, during the phase change of the software installing process. Then, task scheduler 1026 sends the obtained information via updater 1024 to packager and distributor 1042 in server 104. In this manner, updater 1024 can obtain packaged datasheets and/or artifacts distributed by packager and distributor 1042 and stores the datasheets and/or artifacts therein. Additionally, updater 1024 unpacks the packaged datasheets and/or artifacts. In other words, software installer 1022 does not get in direct touch with updater 1024.

After task scheduler 1026 accomplishes the additional task of the current phase, and specifically, accomplishes the additional task of the dependency and conflict checking phase, software installer 1022 executes the build-in task. Specifically, dependency and conflict checking portion 1022B executes checking of dependency and conflicts with other software on client 102.

In an embodiment, task scheduler 1026 notifies software installer 1022 that it has accomplished the additional task of the current phase, by sending a message thereto, and software installer 1022 then continues to execute the build-in task of the current phase.

In another embodiment of the present invention, after task scheduler 1026 accomplishes the additional task of the current phase, identifier 1025 will no longer prevent the software installer 1022 from executing the build-in task of the current phase, so that software installer 1022 can continue to execute the build-in task of the current phase.

When dependency and conflict checking portion 1022B accomplishes its build-in task, and software package installing portion 1022C will execute its build-in task, in other words, when the phase of the software installing process changes again, software installer 1022 temporarily suspends executing its build-in task, and task scheduler 1026 executes the additional task so that the software installing process can meet different deployment requirements.

After task scheduler 1026 is triggered, it retrieves an additional task from updater 1024 and executes the additional task. In this phase, the aforesaid additional task can include that DRE 1026A patches software, installs a piece of software, uninstalls software that has been installed on client 102, etc. For example, when the above additional task for dependency and conflict checking checks a conflict problem between software, the problem can be resolved by uninstalling the conflicting software; when the above additional task for dependency and conflict checking checks a dependency problem between software, the problem can be resolved by installing the dependent software that can be provided by, for example, software repository 1044.

Those skilled in the art can understand that, when the phase of the software installing process changes again, update data can again be obtained from packager and distributor 1042 via updater 1024.

After task scheduler 1026 accomplishes the additional task of current phase, software installer 1022 continues to execute the build-in task of current phase. That is, software packaging installing portion 1022C unpacks software, copies the software to a right place, and registers the COM (component object model) component, etc.

When software package installing portion 1022C accomplishes its build-in task, the software configuring portion 1022D will execute its build-in task (i.e., when the phase of the software installing process changes again, the software installer 1022 temporarily suspends executing its build-in task, and the task scheduler 1026 executes the additional task so that the software installing process can meet different deployment requirements.

After task scheduler 1026 is triggered, it retrieves an additional task of the current phase from updater 1024 and executes the additional task. In this phase, the above additional task can include adding, changing and/or deleting configurations in a configuration file by configurations changer 1026B. For example, as described above, when the conflicting software is uninstalled, configurations changer 1026B deletes from the configuration file configurations associated with the software. Alternatively, when the dependent software is installed, configurations changer 1026B adds to the configuration file configurations associated with the software. Specifically, configurations changer 1026B can, via an interface 1030 such as an SQL-like interface, access a configuration file interface 1028 to the configuration file in order to add, change and/or delete configurations in the configuration file.

Examples of the configuration file include, but are not limited to, Properties File, Windows-Registry File, and XML Configuration File. Correspondingly, interface 1028 to the configuration file includes Properties File interface 1028A, Windows-Registry File interface 1028B, and XML Configuration File interface 1028C.

After task scheduler 1026 accomplishes the additional task of the current phase, software installer 1022 continues to execute its build-in task of the current phase. That is, software configuring portion 1022D writes some configuration parameters to the configuration file.

If, during the time when the software installer 1022 executes its build-in task and/or during the time when the task scheduler 1026 executes an additional task retrieved from updater 1024, failure occurs and cannot be automatically resolved, software installer 1022 and/or task scheduler 1026 can report the failure to the symptom database 1048 via symptom reporter 1020, for the purpose of analyzing and resolving the failure in the future. The reported contents can include in which phase of software installation the above failure occurs, in what environment the above software installation is implemented, etc.

As seen from the above description, the entities associated with software installation, such as updater 1024, identifier 1025, task scheduler 1026, and symptom reporter 1020, are all disposed outside software installer 1022. In this manner, software can be installed in accordance with different deployment requirements without the need for modifying the software installer.

Of course, those skilled in the art can understand that the entities associated with software installation, such as updater 1024, identifier 1025, task scheduler 1026, and symptom reporter 1020, are all disposed inside software installer 1022. In this manner, a software installer capable of installing software in accordance with different deployment requirements is provided.

Moreover, in the above description, it is supposed that first task scheduler 1026 executes an additional task of a phase, and then software installer 1022 executes the build-in task of this phase. However, those skilled in the art should understand that the present invention is not so limited. In other words, it can be such that first software installer 1022 executes the build-in task of a phase, and then task scheduler 1026 executes an additional task of this phase, or that task scheduler 1026 and software installer 1022 execute additional and build-in tasks of a phase in parallel.

Figure 6:
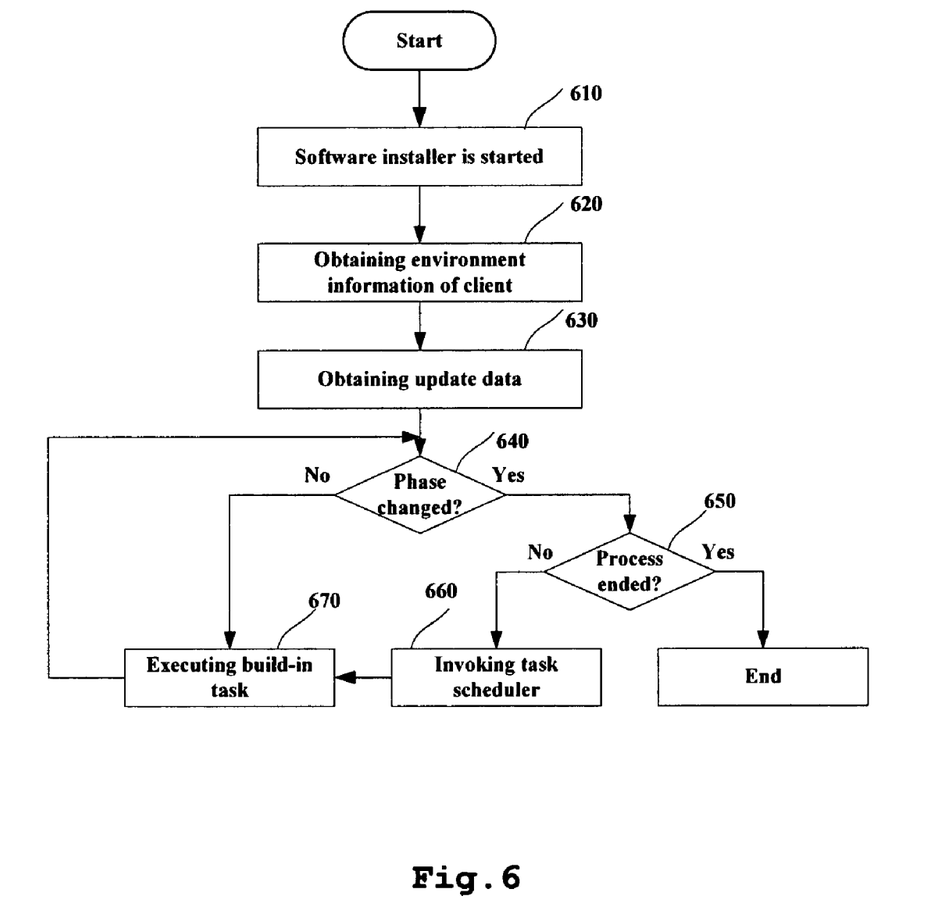
FIG. 6 is a flowchart of a process for installing software according to an embodiment of the present invention.

FIG. 6 is a flowchart of a process for installing software according to an embodiment of the present invention. First, a software installer is started (step 610). Next, client environment information for the client on which the software is to be installed is collected (step 620), such as name and version information of the operating system installed on this client, information regarding software that has been installed on this client, etc. Then, update data for the software installing process is obtained by sending, together with information of the software installer per se, version information of software to be installed, the environment information and the like to a packager and distributor (step 630).

It is then judged whether the phase of the software installing process changes (judgment 640). If the phase of the software installing process changes (branch "Yes" of judgment 640), then it is further judged whether the software installing process ends (judgment 650). If the software installing process has not ended (branch "No" of judgment 650), then task scheduler (step 660) is invoked (step 660) which executes an additional task of the current phase retrieved from the update data for the software installing process. After the task scheduler executes the additional task, the software installer executes a build-in task of the current phase (step 670).

If the phase of the software installing process does not change (branch "No" of judgment 640), a build-in task of the current phase is executed (step 670), and after the execution of the build-in task, it is judged whether the phase of the software installing process changes (judgment 640). If the software installing process ends (branch "Yes" of judgment 650), then the entire software installing process ends.

Figure 7:
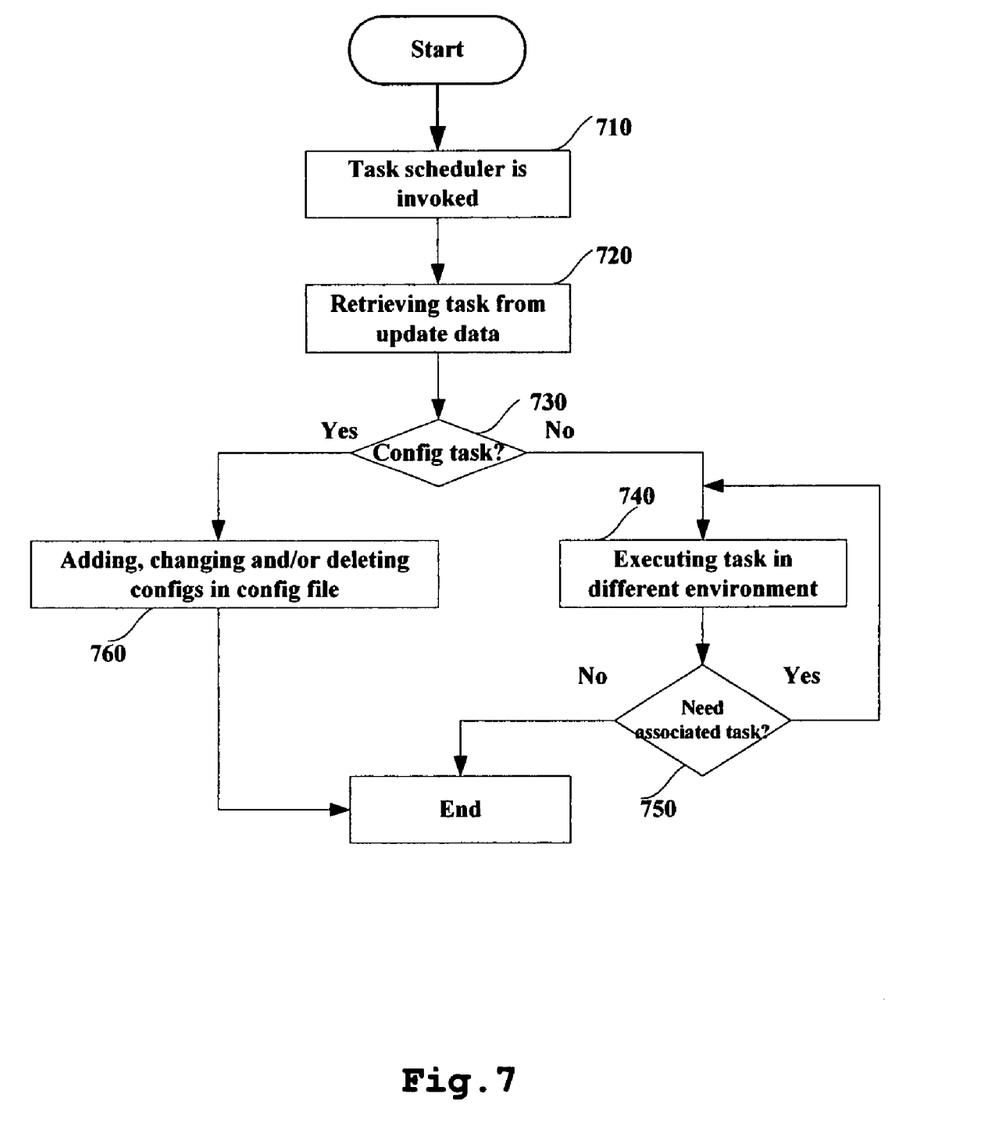
FIG. 7 is a flowchart of part of a process for installing software according to an embodiment of the present invention.

FIG. 7 is a flowchart of part of a process for installing software according to an embodiment of the present invention. First, a task scheduler is invoked (step 710). Next, the task scheduler retrieves an additional task of the current phase from update data for the software installing process (step 720). Moreover, the task scheduler judges whether the additional task is a configuration task (step 730). If the additional task is a configuration task (branch "Yes" of judgment 730), then the task scheduler adds, changes and/or deletes configurations in a configuration file (step 760), and after the task scheduler accomplishes the configuration task, it ends its work.

If the additional task is not a configuration task (branch "No" of judgment 730), then the task scheduler executes the additional task in different environment based on the script type of the additional task (step 740). After the task scheduler accomplishes the additional task, it judges whether a task associated with the additional task needs to be executed (step 750). For example, after a checking task for a specific problem is accomplished, perhaps an associated resolving task needs to be executed. When a task associated with the task (branch "Yes" of judgment 750) needs to be executed, the task scheduler executes the associated task in different environment based on the script type of the associated task (step 740). When the task scheduler determines that no task associated with the task needs to be executed (branch "No" of judgment 750), the task scheduler ends its work.

It should be noted that in order to facilitate easier understanding of the present invention, the above description omits technical details that are well known to those skilled in the art.

The description of the present invention has been presented for purposes of illustration and description, and is not intended to be exhaustive or limited to the invention in the form disclosed. Many modifications and variations will be apparent to those of ordinary skill in the art. For example, the above embodiments can be subjected to such a modification, wherein client 102 retrieves update data for the software installing process from a CD-ROM driver or a hard disc driver (not depicted) thereon. In other words, in this modification, datasheets and/or artifacts provided by the software repository, the solution repository, and the symptom database are stored in, for example, an optical disc and/or a hard disc, so that client 102 does not need to retrieve these datasheets and/or artifacts from server 104 via network 100. Therefore, the embodiments were chosen and described in order to best explain the principles of the invention, the practical application, and to enable others of ordinary skill in the art to understand that all modifications and alterations fall into the protection scope of the present invention as defined in the claims without departing from the spirit of the present invention.

What is claimed is:

1. A computer system for facilitating installing software, comprising:

a computer having at least one processor for implementing components;

a communication component for automatically obtaining installation-specific information;

an identifier component for automatically identifying whether a phase of a software installing process changes; and a task scheduler component for, responsive to the identifier identifying a change in the phase of the software installing process, determining a symptom associated with the phase, accessing a symptom database, identifying a solution comprising as additional task of the current phase, and automatically executing an additional task of the current phase of the software installing process based on said installation-specific information.

2. The system according to claim 1, wherein said additional task comprises checking for dependency and conflicts between the software and other software.

3. The system according to claim 1, wherein said additional task comprises at least one of:

patching the software;

installing a piece of software; and uninstalling a piece of software.

4. The system according to claim 1, wherein said additional task comprises at least one of:

adding configurations in a configuration file;

changing configurations in the configuration file; and
deleting configurations in the configuration file.

5. The system according to claim 1, further comprising:
a symptom reporter for reporting failure occurring during the execution of said additional task.

6. The system according to claim 1, wherein said communication component comprises:
an updater for obtaining update data at least comprising the additional task and script for executing the additional task.

7. The system according to claim 6, wherein said update data comes from a packager and distributor.

8. The system according to claim 6, wherein said update data comprises at least one of:
a datasheet from a software repository, artifacts from a software repository, a datasheet from a solution repository, artifacts from a solution repository, a datasheet from a symptom database and artifacts from a symptom database.

9. The system according to claim 8, wherein said symptom database comprises problem checking scripts and corresponding problem resolving scripts.

10. A method for facilitating installing software, comprising the steps of:
automatically obtaining installation-specific information;
automatically identifying whether a phase of a software installing process changes; and
responsive to identification of a change in the phase of the software installing process, determining a symptom associated with the phase, accessing a symptom database, identifying a solution comprising as additional task of the current phase, and automatically executing an additional task of the current phase of the software installing process based on said installation-specific information.

11. The method according to claim 10, wherein said additional task comprises checking for dependency and conflicts between the software and other software.

12. The method according to claim 10, wherein said additional task comprises at least one of:
patching the software;
installing a piece of software; and
uninstalling a piece of software.

13. The method according to claim 10, wherein said additional task comprises at least one of:
adding configurations in a configuration file;
changing configurations in the configuration file; and
deleting configurations in the configuration file.

14. The method according to claim 10, further comprising the step of:
reporting failure occurring during the execution of said additional task.

15. The method according to claim 10, further comprising the step of:
obtaining update data at least comprising the additional task and script for executing the additional task.

16. The method according to claim 15, wherein said update data comprises at least one of:
a datasheet from a software repository, artifacts from a software repository, a datasheet from a solution repository, artifacts from a solution repository, a datasheet from a symptom database and artifacts from a symptom database.

17. The method according to claim 16, wherein said symptom database comprises problem checking scripts and corresponding problem resolving scripts.

18. A computer program product comprising computer executable code stored on a non-transitory computer readable medium for performing method steps for facilitating installing software, wherein the method comprises the steps of:
automatically obtaining installation-specific information;
automatically identifying whether a phase of a software installing process changes; and
responsive to identification of a change in the phase of the software installing process, determining a symptom associated with the phase, accessing a symptom database, identifying a solution comprising as additional task of the current phase, and automatically executing an additional task of the current phase of the software installing process based on said installation-specific information.

* * * * *